United States Patent [19]

Hasegawa et al.

[11] 4,352,130
[45] Sep. 28, 1982

[54] MAGNETIC SOUND RECORDER HAVING COMPUTER-CONTROLLED ADJUSTING DEVICE

[75] Inventors: Tsunao Hasegawa; Yasushi Ohtake, both of Tokorozawa, Japan

[73] Assignee: Pioneer Electronic Corporation, Tokyo, Japan

[21] Appl. No.: 93,986

[22] Filed: Nov. 14, 1979

[30] Foreign Application Priority Data

Nov. 14, 1978 [JP] Japan .................................. 53-140701

[51] Int. Cl.³ .............................................. G11B 5/47
[52] U.S. Cl. .......................................... 360/66; 360/65
[58] Field of Search ...................................... 360/66, 65

[56] References Cited

U.S. PATENT DOCUMENTS

| 2,791,640 | 5/1957 | Wolfe | 360/25 |
| 4,011,585 | 3/1977 | Sunaga | 360/66 |
| 4,038,692 | 6/1977 | Umeda et al. | 360/25 |

FOREIGN PATENT DOCUMENTS

2916776 10/1979 Fed. Rep. of Germany ........ 360/66
WO79/00715 10/1979 PCT Int'l Appl. .

Primary Examiner—Vincent P. Canney
Attorney, Agent, or Firm—Michael J. Striker

[57] ABSTRACT

A magnetic-tape sound recorder which features a computer-controlled adjusting device capable of automatically adjusting the recording signal level and the recording bias current depending upon the magnetic tape to be put to use on the sound recorder.

6 Claims, 8 Drawing Figures

MAGNETIC SOUND RECORDER HAVING COMPUTER-CONTROLLED ADJUSTING DEVICE

FIELD OF THE INVENTION

The present invention relates to magnetic-tape sound recorders and, particularly, to a magnetic-tape sound recorder having a computer-controlled device for adjusting the signal level of the recording signal and the bias current to be impressed on the recording signal for thereby providing substantially "flat" or constant recording and reproducing frequency characteristics throughout the low to medium and high frequency ranges operable in the sound recorder.

BACKGROUND OF THE INVENTION

It is well known in the art of magnetic-tape sound recorders that the recording and reproducing frequency characteristics and the harmonic distorsion characteristics vary markedly with the bias current superposed on the recording signals supplied to the recording head of the sound recorder. Proper selection of the recording bias current is, for this reason, an essential requirement for achieving satisfactory recording and reproducing frequency characteristics in a magnetic-tape sound recorder. Since, however, the frequency response characteristics of a magnetic-tape sound recorder varies from one magnetic tape to another due to the difference between the respective recording and playback sensitivities of the tapes which may be of the same type or make, extreme difficulties have been encountered in achieving satisfactorily "flat" frequency response characteristics for all the magnetic tapes to be put to use on the sound recorder. The present invention aims at resolution of such a problem and contemplates provision of a magnetic-tape sound recorder incorporated with a computer-controlled device for automatically adjusting the signal level of the recording signal and the bias current to be superposed on the recording signal prior to recording and playback using a magnetic tape. More specifically, the present invention contemplates improvement of the apparatus disclosed in U.S. Patent Application Serial No. 096,265.

SUMMARY OF THE INVENTION

In accordance with the present invention, there is provided a magnetic-tape sound recorder including a computer-controlled device for automatically adjusting the recording signal level and the bias current to be added to the recording signal, wherein the improvement comprises sources of first and second recording signals having different frequencies, a recording signal level control circuit operative to vary the signal level of the recording signal supplied thereto, a bias signal control circuit operative to vary the bias current to be impressed on the output signal from the recording signal level control circuit, and digital signal processing means coupled with the signal level control circuit and the bias signal control circuit and programmed to provide at least two consecutive cycles each consisting of a first step of varying the signal level of the first recording signal in the recording signal level control circuit with the bias current fixed at a predetermined level in the bias signal control circuit until the signal level of the output signal delivered from the signal level control circuit reaches a value at which the signal level of the playback signal resulting from such an output signal is substantially equalized with the signal level of the output signal, and a second step of varying the level of the bias current in the bias signal control circuit with the signal level of the second recording signal fixed at the aforesaid value until the signal level of the playback signal resulting from the afore-said output signal is substantially equalized with the signal level of the output signal.

DESCRIPTION OF THE DRAWINGS

The features and advantages of a magnetic-tape sound recorder incorporating the improvement according to the present invention will be more clearly appreciated from the following description taken in conjunction with the accompanying drawings, in which.

DESCRIPTION OF THE PREFERRED EMBODIMENT

Figure 1:
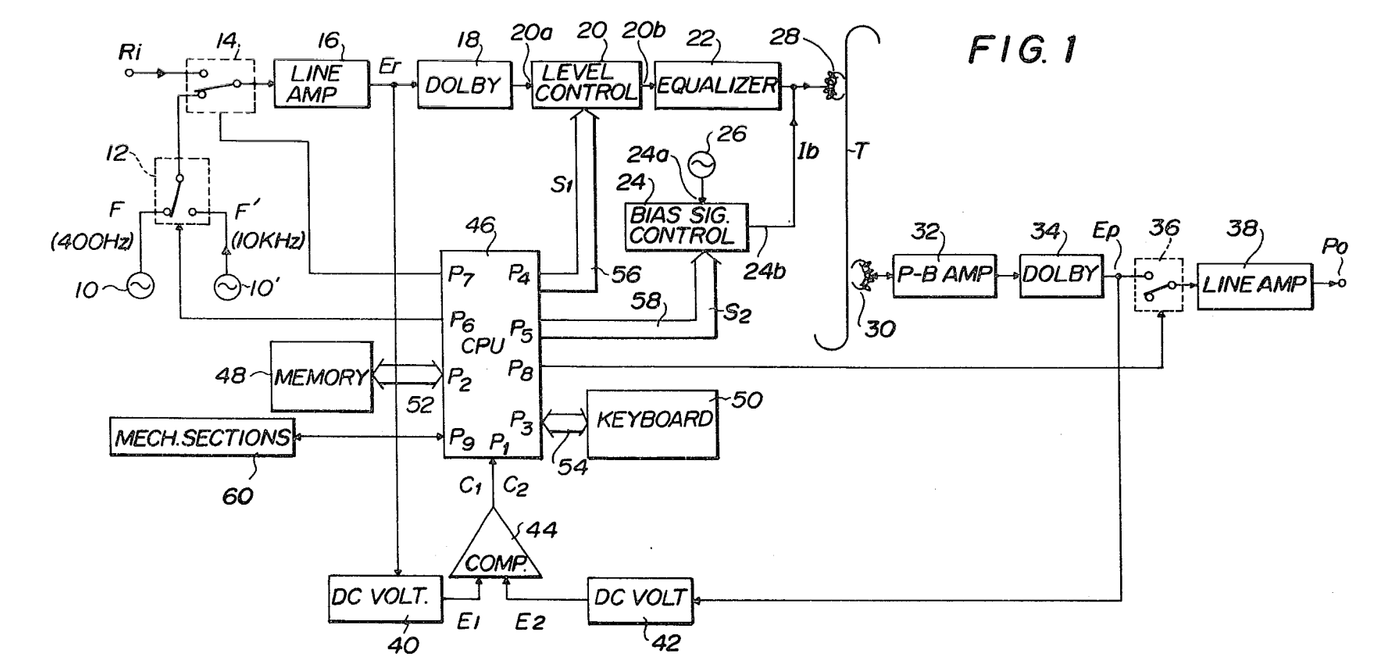
FIG. 1 is a block diagram schematically showing an electric circuit arrangement of a computer-controlled device included in a magnetic-tape sound recorder incorporating the improvement according to the present invention.

In the description to follow, it will be assumed by way of example that the present invention is embodied in a magnetic sound recorder of the type which uses as a recording medium a magnetic tape which is represented by T in the drawings, particularly in FIG. 1. It will be, however, apparent that the subject matter of the present invention is applicable to not only a magnetic-tape sound recorder but magnetic sound recorders using other types of electro-magnetically activated recording media such as magnetic metal wires.

Referring to the drawings, first particularly to FIG. 1, a device embodying the present invention comprises first and second signal supply means which are constituted by first and second frequency generators 10 and 10' adapted to produce output signals F and F', respectively, having different frequencies. The frequency of the signal F to be dilivered from the first frequency generator 10 is selected from a relatively low range of the frequency band ordinarily used in a magnetic-tape sound recorder and is herein assumed to be predetermined at 400 hertz by way of example. On the other hand, the frequency of the signal F' to be delivered from the second frequency generator 10' is selected from a relatively high range of the frequency band and is assumed also by way of example to be predetermined at 10 kilo-hertz.

The first and second frequency generators 10 and 10' thus arranged are electrically connected in parallel to the series combination of a two-position shift switch 12 and a two-position recording-line switch 14. The shift switch 12 is shiftable between two terminals or contacts respectively connected to the first and second frequency generators 10 and 10', while the recording-line switch 14 is shiftable between an input terminal or contact connected to the output terminal of the shift switch 12 and an input terminal or contact connected to the recording-line input terminal Ri of the magnetic-tape sound recorder per se. On the recording-line input terminal Ri of the magnetic-tape sound recorder is to be impressed signals representative of the sound information to be recorded on a magnetic tape T when the magnetic-tape sound recorder is in a recording mode of operation. Though not shown in the drawings, each of the shift switch 12 and the recording-line switch 14 has an actuating element and is operated to shift between the two positions thereof under the control of the actuating element as will be described in more detail.

The output terminal of the recording-line switch 14 thus arranged is electrically connected across a recording-line amplifier 16 and through a Dolby noise reduction circuit 18 to the input terminal of a recording signal level control circuit 20. The recording signal level control circuit 20 is adapted to continuously vary the signal level of the signal passed through the first and second switches 12 and 14 or the recording-line switch 14 alone and amplified by the line amplifier 16. The dolby noise reduction circuit 18 is operative to supress tape noises as is well known in the art of magnetic-tape sound recorders. The level control circuit 18 has an output terminal connected to an adjustable recording-signal equalizer circuit 22 adapted to adjust the amount of compensation for attenuated recording frequency characteristic at relatively high frequency levels including the frequency (10 kilo-hertz) of the signal F' to be delivered from the above described second frequency generator 10'. The adjustable recording-signal equalizer circuit of the nature described above is well known in the art and description regarding the construction and the principle of operation of the circuit will not be incorporated herein.

In parallel with the recording-signal equalizer circuit 22 is electrically connected to bias signal control circuit 24 having an input terminal connected to a suitable soure 26 of a d.c. or a.c. bias signal such as, for example, an alternating current of 100 kilo-hertz. The recording-signal equalizer circuit 22 and the bias signal control circuit 24 have respective output terminals jointly connected to electro-magnetic recording means such as, for example, the recording head 28 of the magnetic-tape sound recorder. The output signal from the recording-signal equalizer circuit 22 has superposed thereon a controlled bias signal delivered from the bias signal control circuit 24 and the resultant signal is impressed on the recording head 28. The electric signal thus fed to the recording head 28 is recorded as a corresponding magnetic signal on the magnetic tape T which is being driven to travel in contact with the recording head 28.

The magnetic signal on the magnetic tape T is, in turn, converted into a corresponding electric signal by electro-magnetic playback means constituted by, for example, the playback head 30 of the magnetic-tape sound recorder. As is customary in an ordinary magnetic-tape sound recorder, the playback head 30 is electrically connected to the input terminal of a playback amplifier 32 having included therein a playback-signal equalizer circuit (not shown). The playback amplifier 32 in turn is connected through a Dolby noise reduction circuit 34 and across a two-position playback-line switch 36 to the input terminal of a playback-line amplifier 38 having its output terminal connected to the playback-line output terminal Po of the magnetic-tape sound recorder. The playback-line switch 36 has an actuating element (not shown) adapted to operate the switch 36 between a position providing connection between the Dolby noise reduction circuit 34 and the playback-line amplifier 38 and a position interrupting the connection therebetween. When connection is established between the Dolby noise reduction circuit 34 and the playback-line amplifier 38 through the playback-line switch 36, signals to reproduce the sound information originally represented by the signals impressed on the recording-line input terminal Ri appear at the playback-line output terminal Po.

In the embodiment of the present invention, there are further provided first and second d.c. voltage generators 40 and 42 between the recording and playback lines of the magnetic-tape sound recorder. The first d.c. voltage generator 40 has an input terminal connected to the output terminal of the recording-line amplifier 16 and is operative to produce a d.c. output voltage $E_1$ which is variable with the signal level (denoted as Er) of the recording signal to be delivered from the recording-line amplifier 16. On the other hand, the second d.c. voltage generator 42 has an input terminal connected to the output terminal of the Dolby noise reduction circuit 34 in the playback line and is operative to produce a d.c. output voltage $E_2$ which is variable with the signal level (denoted as Ep) of the playback signal appearing at the output terminal of the Dolby noise reduction circuit 34. The first and second d.c. voltage generators 40 and 42 thus arranged have respective output terminals connected to a two-input comparator circuit 44 which is adapted to compare the d.c. output voltages $E_1$ and $E_2$ from the first and second d.c. voltage generators 40 and 42 with each other and produce an output signal $C_1$ when the voltage $E_1$ is higher than the voltage $E_2$ and an output signal $C_2$ when the voltage $E_1$ is lower than the voltage $E_2$. The output signal $C_1$ or $C_2$ produced by the comparator circuit 44 may be supplied to a display circuit (not shown) which is responsive to the signal $C_1$ or $C_2$ for producing a visual signal indicating that the voltage $E_1$ is higher or lower, respectively, than the voltage $E_2$.

The output signals $C_1$ and $C_2$ to be delivered from the comparator 44 are in the form of, for example, high and low d.c. voltages, respectively, and are fed to a suitable electric control circuit such as a microcomputer including a central processing unit 46 (CPU), a memory unit 48, and a keyboard unit 50 as shown. The central processing unit 46 has an input port $P_1$ connected to the output terminal of the comparator 44, an input/output port $P_2$ connected to the memory unit 48 through a bi-directional memory bus 52, and an input/output port P3 connected to the keyboard unit 50 through a bi-directional keyboard bus 54. Though not shown in the drawings, the memory unit 48 is assumed, by way of example, as consisting of a read only memory (ROM) section having stored therein a collection of data programmed to control the behaviours of the central processing unit 46 and a random access memory (RAM) section capable of writing in and reading out various pieces of information required for the operation of the central processing unit 46. The random access memory section of the memory unit 48 is supplied with power from an external power source (not shown) when the magnetic-tape sound recorder is in operation but, when the sound recorder is not in use and the supply of power from the external power source is interrupted or not available, the particular section of the memory unit 48 is powered from a backup power source (not shown) incorporated in the microcomputer per se so as to retain the collection of data stored therein. The keyboard unit 50 may include suitable display means (not shown) adapted to permit visual monitoring of the behaviours of the central processing unit 46 during operation of the unit 46.

The central processing unit 46 further has an output port $P_4$ connected through a unidirectional bus 56 to the recording level control circuit 20 and an output port $P_5$ connected through a unidirectional bus 58 to a control terminal of the bias signal control circuit 24 for supplying binary digital signals $S_1$ and $S_2$ to the recording level and bias signal control circuits 20 and 24, respectively. The central processing unit 46 still further has an output port $P_6$ connected to the actuating element of the shift switch 12, an output port $P_7$ connected to the actuating element of the recording-line switch 14, and an output port $P_8$ connected to the actuating element of the playback-line switch 36 for causing each of the switches 12, 14 and 36 to shift between the two positions thereof under the control of signals to be delivered thereto from the central processing unit 46. If desired, the output ports $P_7$ and $P_8$ connected to the recording-line and playback-line switches 14 and 36 may be constituted by a single port so that the two switches 14 and 36 are operated to concurrently shift between the respective two positions thereof. The central processing unit 46 is further shown having an input/output port $P_9$ connected to actuating elements for various mechanical sections 60 of the magnetic-tape sound recorder for controlling the motions of the mechanical sections 60 depending upon signals delivered from the central processing unit 46 or, conversely, feeding back signals from the mechanical sections 60 to the central processing unit 46.

In the embodiment of the present invention, the binary digital signals $S_1$ and $S_2$ to be delivered from the output ports $P_4$ and $P_5$ of the central processing unit 46 to the recording signal level control circuit 20 and the bias signal control circuit 24, respectively, are produced as six-bit hexadecimal numbers ranging from the smallest number 00(H) to the largest number 3F(H). The smallest hexedecimal number 00(H) is binary coded as "000000" and corresponds to the number 0 in the decimal system while the largest hexedecimal number 3F(H) is binary coded as "111111" and corresponds to the number 63 in the decimal system as is customary in the art of digital computers. The recording signal level control circuit 20 is arranged in such a manner as to be operable for stepwise varying the impedance between the input and output terminals (indicated at 20a and 20b, respectively, in FIG. 1) of the control circuit 20 with respect to the ground level depending upon the signals $S_1$ thus delivered from the port $P_4$ of the central processing unit 46. On the other hand, the bias signal control circuit 24 is arranged to be operable for stepwise varying the resistance between the input and output terminals (indicated at 24a and 24b, respectively, in FIG. 1) of the control circuit 24 with respect to the ground level depending upon the signals $S_2$ delivered from the port $P_5$ of the central processing unit 46.

Figure 2:
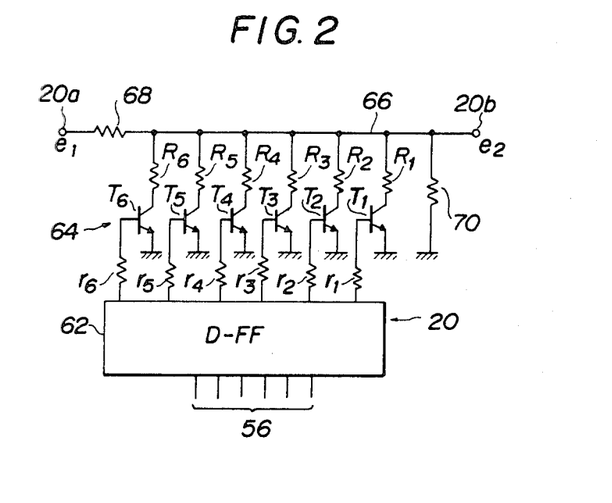
FIG. 2 is a view showing, partly in block form, a preferred example of the circuit arrangement of a recording signal level control circuit forming part of the circuit arrangement illustrated in FIG. 1.

In FIG. 2, the recording signal level control circuit 20 to achieve the function above described is shown comprising a suitable memory circuit such as a delayed flipflop circuit 62 (D-FF) consisting of a parallel combination of six flipflop units and a scanning network 64 including a positive bus line 66 connected between the input and output terminals 20a and 20b of the control circuit 20 through a resistor 68 and grounded through a resistor 70. The scanning network 64 further includes first to sixth resistors $R_1, R_2, \ldots R_6$ connected in parallel with each other between the bus line 66 and ground through suitable switching elements such as transistors $T_1, T_2, \ldots T_6$, respectively. Each of the transistors $T_1, T_2, \ldots T_6$ has its collector electrode connected to the bus line 66 through the associated one of the resistors $R_1, R_2, \ldots R_6$ and its emitter electrode connected to ground. The respective base electrodes of the transistors $T_1, T_2, \ldots T_6$ are connected in parallel with each other to the output terminals of the delayed flipflop circuit 62 through resistors $r_1, r_2, \ldots r_6$, respectively, as shown. The resistors $R_1, R_2, \ldots R_6$ connected in series with the collector electrodes of the transistors $T_1, T_2, \ldots T_6$, respectively, have different resistance values which form a geometric progression with a predetermined common ratio of, for example, 2:1. If, thus, the first resistor $R_1$ has the resistance value is assumed to be Ro, then the second to sixth resistors $R_2, R_3, R_4, R_5$ and $R_6$ have the resistance values of 2Ro, 4Ro, 8Ro, 16Ro and 32Ro, respectively, provided the common ratio of the geometric series is 2:1 as above mentioned.

The input terminals of the delayed flipflop circuit 62 are connected to the bus 56 leading from the output port $P_4$ of the central processing unit 46 of the microcomputer shown in FIG. 1 and are respectively allocated to the individual digits of the six-bit binary digital signals $S_1$. When, thus, the signals $S_1$ variable from the smallest hexadecimal number 00(H) to the largest hexadecimal number 3F(H) are fed to the delayed flipflop circuit 62 through the bus 56, the transistors $T_1, T_2, \ldots T_3$ are made conductive and non-conductive in a total of 64 combinations so that the scanning network 64 produces 64 different effective resistance values. The respective resistance values of the resistors included in the scanning network 64 are selected so that the ratio between the potentials $e_1$ and $e_2$ at the input and output terminals 20a and 20b, respectively, of the recording signal level control circuit 20 varies with the signals $S_1$ in a manner indicated by curve a shown in FIG. 3.

Figure 4:
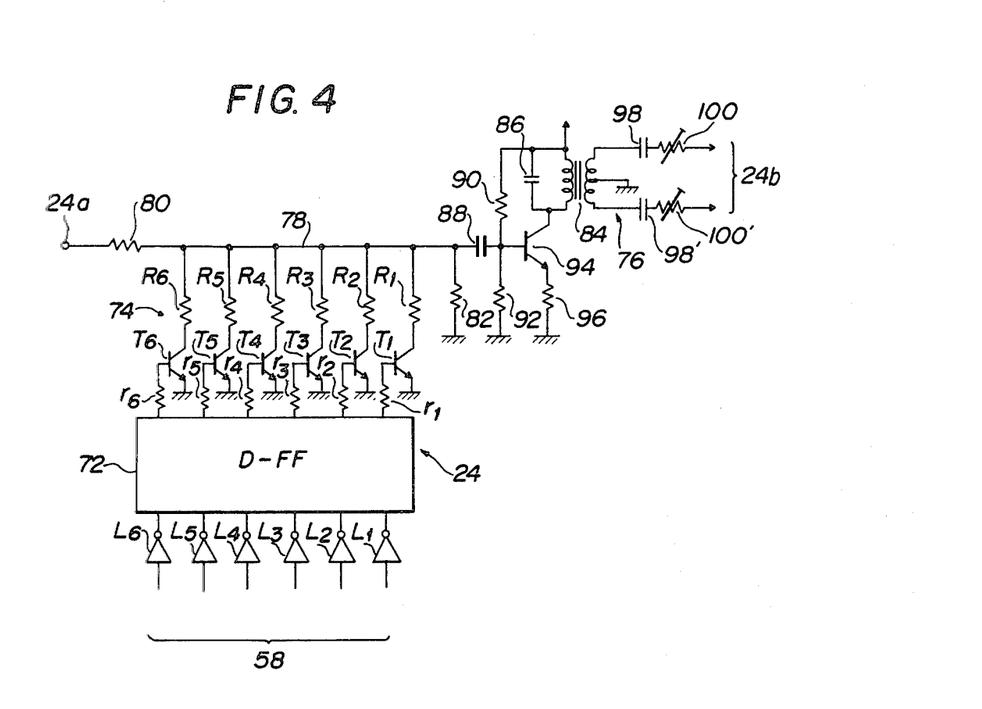
FIG. 4 is a view showing, partly in block form, a preferred example of the circuit arrangement of a recording bias signal control circuit forming part of the circuit arrangement illustrated in FIG. 1.

On the other hand, the bias signal control circuit 24 comprises, as shown in FIG. 4, a suitable memory circuit such as a delayed flipflop circuit 72 having six input terminal and six output terminals, six logic inverters $L_1, L_2, \ldots L_6$, a scanning network 74, and a transformer-coupled high-frequency amplifier 76. The delayed flipflop circuit 72 consists of a parallel combination of six delayed flipflop units having input terminals connected to the output terminals of the logic inverters $L_1, L_2, \ldots L_6$, respectively. The scanning network 74 comprises a positive bus line 78 which is connected between the input terminal 24a of the bias signal control circuit 24 and the above mentioned transformer-coupled high-frequency amplifier 76 through a resistor 80 and which is grounded through a resistor 82. The scanning network 74 is, in other respects, constructed similarly to the scanning network 62 of the recording signal level control circuit 20 illustrated in FIG. 2 and, thus, further comprises resistors $R_1$, $R_2$, ... $R_6$, transistors $T_1$, $T_2$, ... $T_6$ and resistors $r_1$, $r_2$, ... $r_6$ which are arranged similarly to their respective counterparts in the control circuit 20 shown in FIG. 2.

The transformer-coupled high-frequency amplifier 76 comprises a transformer 84 having a primary winding shunted by a capacitor 86 and a secondary winding having at its middle point a tap connected to ground. The capacitor 86 forms part of an induction compensating network for the primary winding of the transformer 84 and is connected in parallel with the primary winding to the positive bus line 78 of the above described scanning network 74 through a capacitor 88 and a resistor 90 forming part of a voltage-dividing circuit which further comprises a resistor 94 grounded at one end and connected at the other end thereof to a junction between the capacitor 88 and the resistor 90. To the junction between the capacitor 88 and resistors 90 and 92 is connected the base electrode of a transistor 94 which has its emitter electrode connected to ground and its collector electrode connected to a junction between the primary winding of the transformer 84 and the capacitor 86. The secondary winding of the transformer 84 is connected at its ends to the voice coils of the left and right loudspeakers (not shown) of the stereophonic sound recorder system through impedance matching capacitors 98 and 98' and semi-adjustable resistors 100 and 100'.

The logic inverters $L_1$, $L_2$, ... $L_6$ have respective input terminals connected to the bus 58 leading from the output port $P_5$ of the central processing unit 46 of the microcomputer shown in FIG. 1 and are respectively allocated to the individual digits of the six-bit binary digital signals $S_2$ to be delivered from the port $P_5$. When the signals $S_2$ variable from the smallest hexadecimal number 00(H) to the largest hexadecimal number 3F(H) are fed to the inverters $L_1$, $L_2$, ... $L_6$ through the bus 58, the binary codes constituting each of the six-bit binary digital signals $S_2$ are logically inverted by the inverters $L_1$, $L_2$, ... $L_6$ so that the delayed flipflop circuit 72 is supplied with the inverted versions of the signals $S_2$. As a consequence, the ratio between the input and output terminals of the bus line 78 and accordingly the bias current Ib to be delivered from the scanning network 74 varies with the signals $S_2$ in a manner indicated by curve b in FIG. 5, viz., generally inversely to the ratio $e_2/e_1$ indicated in the graph of FIG. 3.

Suppose, now, that the signal level Ep, viz., the potential at the output terminal of the Dolby noise reduction circuit 34 in the playback line of the arrangement illustrated in FIG. 1 assumes a certain value Eo when a magnetic tape recorded at the signal level of zero volume unit (O vu) is reproduced. Suppose further that the recording signal level in the magnetic-tape sound recorder thus conditioned is adjusted so that the signal level Er, viz., the potential at the output terminal of the recording-line amplifier 16 assumes the particular value Eo when the relatively low frequency signals F delivered from the first frequency generator 10 are recorded on the same magnetic tape. In this instance, the signal levels Er and Ep will be maintained equal to each other if the voltage level of the signals F delivered from the frequency generator may vary. If the sound recorder has "flat" or constant recording and reproducing frequency characteristics, the signal levels Er and Ep will remain equal to each other also when the relatively high frequency signals F' delivered from the second frequency generator 10' are recorded on the magnetic tape in lieu of the signals F from the first frequency generator 10, even when the signal level of the frequency signals F' may be varied. This means that the recording and reproducing frequency characteristics of a magnetic-tape sound recorder can be maintained "flat" or constant at all frequencies of interest if the signal levels Er and Ep, viz., the potentials at the output terminal of the recording-line amplifier 16 and the input terminal of the playback-line amplifier 38 in the arrangement shown in FIG. 1 are substantially equal to each other.

If the magnetic tape is replaced with another tape having a recording sensitivity higher by, for example, 2 decibels than that of the former and the new tape is used to record and reproduce the relatively low frequency signals F from the first frequency generator 10, then the signals F will be recorded at a sensitivity higher by about 2 decibels than the recording sensitivity achieved with the former magnetic tape. The recording sensitivity of the sound recorder can thus be corrected properly if the recording signal level is adjusted to make the signal levels Er and Ep equal to each other. If the recording signal level is further adjusted to make the signal levels Er and Ep equal to each other when the relatively high frequency signals F' from the second frequency generator 12 are recorded and played back with use of the new magnetic tape, the recording and reproducing frequency characteristics of the sound recorder can be made "flat" or constant for the new magnetic tape.

The recording signal level control circuit 20 shown in FIG. 2 and the bias signal control circuit 24 shown in FIG. 4 are arranged to realize the above described basic concepts in achieving substantially flat or constant recording and reproducing frequency characteristics at substantially all the frequencies of interest in a magnetic-tape sound recorder.

Figure 5:
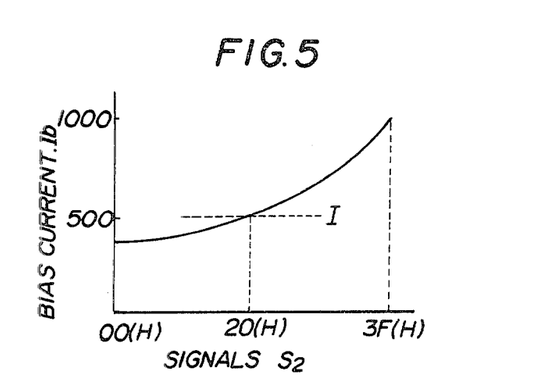
FIG. 5 is a graph showing an example of the schedule in accordance with which the bias current to be delivered from the control circuit illustrated in FIG. 4 is to be varied.
Figure 6:
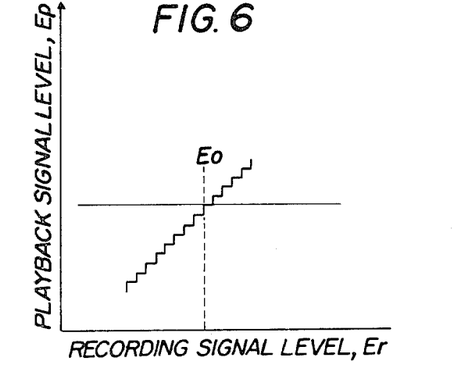
FIG. 6 is a graph showing an example of the relationship between the signal levels of the recording and playback signals varied by stepwise varying the recording signal level in the recording signal level control circuit illustrated in FIG. 2.
Figure 7:
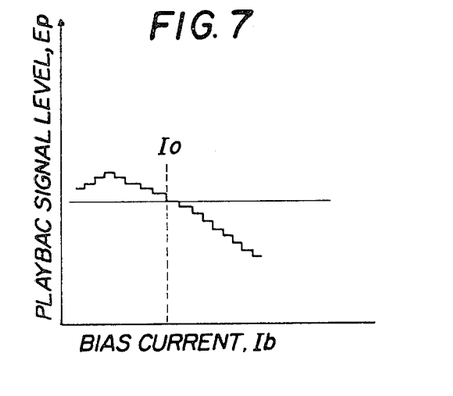
FIG. 7 is a graph showing an example of the relationship between the recording bias current and the signal level of the playback signal varied by stepwise varying the bias current in the bias current control circuit illustrated in FIG. 4.

The principles of operation of the embodiment of the present invention, especially those of the recording signal level and bias signal control circuits 20 and 24 included therein will be hereinafter described in detail with reference to FIGS. 1 to 5 and further to FIGS. 6 and 7, while referring to FIG. 8 which clearly shows the operation of the device of the invention in the form of a flow-chart.

Figure 3:
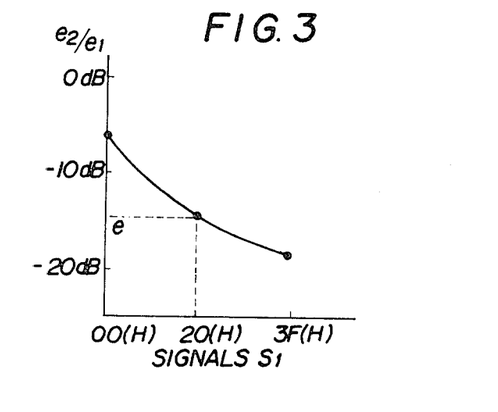
FIG. 3 is a graph showing an example of the schedule in accordance with which the signal level of recording signal to be delivered from the control circuit illustrated in FIG. 2 is to be varied.

When an "AUTO" button included in the keyboard unit 50 of the microcomputer shown in FIG. 1 is manually depressed, the central processing unit 46 is made operative and starts various operations in accordance with the program stored in the read only memory section of the memory unit 48. This operation is represented by a step "START" in the flow-chart of FIG. 8. On the basis of the signals delivered from the random access section of the memory unit 48, predetermined one of the binary digital signals $S_1$ is supplied from the output port $P_4$ of the central processing unit 46 to the recording signal level control circuit 20 via the bus 56 and, concurrently, predetermined one of the binary digital signals $S_2$ is supplied from the output port $P_5$ of the central processing unit 46 to the bia signal control circuit 24 through the bus 58. The predetermined ones of the signals $S_1$ and $S_2$ are herein assumed, by way of example, to be the signals each represented by the hexadecimal number 20(H) which is binary coded as "100000" and which is situated at the middle of the series of the hexadecimal numbers expressed by six digits. Thus, the recording signal level control circuit 20 is adjusted so that the ratio $e_2/e_1$ between the potentials at the input and output terminals 20a and 20b of the circuit 20 assumes a predetermined value e as indicated in FIG. 3, while the bias signal control circuit 24 is adjusted so that the bias current Ib to be delivered therefrom assumes a predetermined value I as indicated in FIG. 5. The above operation is represented by a step (A) in the flow-chart of FIG. 8.

Upon actuation of the central processing unit 46, signals are delivered from the output ports $P_6$, $P_7$ and $P_8$ of the unit 46 and actuates the switches 12, 14 and 36 into positions providing connection from the first frequency generator 10 to the recording-line amplifier 16 through the shift switch 12 and the recording-line switch 14 and connection from the Dolby noise reduction circuit 34 to the playback-line amplifier 38 through the playback-line switch 36. Furthermore, a recording and playback control signal is fed from the port $P_9$ of the central processing unit 46 to the actuating elements of the mechanical sections 60 of the sound recorder (step (B), FIG. 8) and causes the built-in tape-travel or index counter (not shown) of the sound recorder to start counting operation.

Connection being provided from the first frequency generator 10 to the recording-line amplifier 16 through the shift switch 12 and the recording-line switch 14 as above described, the signal F having the relatively low frequency of, for example, 400 hertz is supplied from the first frequency generator 10 to the recording-line amplifier 16 via the series connection of the switches 12 and 14. This operation is shown as a step (C) in the flow-chart. The frequency signal F is, upon amplification by the amplifier 16, fed through the Dolby noise reduction circuit 18 to the recording signal level control circuit 20. The recording signal level control circuit 20 regulates the signal level of the frequency signal F in such a manner that the signal level corresponds to the predetermined value e (FIG. 3) of the ratio between the potentials $e_1$ and $e_2$ at the input and output terminals of the control circuit 20 and deliver the controlled frequency signal to the recording-line equalizer circuit 22. The output signal produced by the recording-line equalizer circuit 22 is modified by the predetermined bias current I (FIG. 5) from the bias current control circuit 24. The recording signal thus produced is supplied to the recording head 28 of the magnetic-tape sound recorder and is recorded as a corresponding magnetic signal on the magnetic tape T being driven to travel in contact with the recording head 28. The magnetic signal thus produced on the travelling magnetic tape T is, immediately thereafter, converted by means of the playback head 30 of the sound recorder into a corresponding electric signal, which is fed through the playback amplifier 32, Dolby noise reduction circuit 34, playback-line switch 36 and playback-line amplifier 38 to the playback-line terminal Po of the sound recorder.

The recording signal appearing at the output terminal of the line amplifier 16 in the recording line and the playback signal appearing at the input terminal of the line amplifier 38 in the playback line are further supplied to the first and second d.c. voltage generators 40 and 42 and are converted into d.c. voltages $E_1$ and $E_2$ which are representative of the signal levels Er and Ep, respectively, of the recording and playback signals. The comparator 44 is operative to compare the d.c. output voltages $E_1$ and $E_2$ from the first and second d.c. voltage generators 40 and 42 and delivers the output signal $C_1$ or the output signal $C_2$ depending upon the relationship between the d.c. voltages $E_1$ and $E_2$. On the basis of the signal $C_1$ or $C_2$ thus delivered from the comparator 44 to the input port $P_1$ of the central processing unit 46, the binary digital signals $S_1$ are successively supplied from the output port $P_4$ of the central processing unit 46 to the delayed flipflop circuit 62 (FIG. 2) of the signal level control circuit 20 through the bus 56. In response to signals $S_1$ thus supplied in succession to the delayed flipflop circuit 62, the effective resistance value of the scanning network 64 is stepwise varied to stepwise vary the recording signal level dictated by the recording signal level control circuit 20 and accordingly the resultant playback signal level Ep as will be seen from FIG. 6. This operation is shown as a step (E) in the flowchart. When the recording signal level provided by the recording signal level control circuit 20 reaches a certain value Eo (FIG. 6) and as a consequence the d.c. voltages $E_1$ and $E_2$ supplied from the first and second d.c. voltage generators 40 and 42 to the comparator 44 are equalized in the process of the scanning operation in the recording signal level control circuit 20, the central processing unit 46 ceases the supply of the signals $S_1$ to the control circuit 20 and maintains the recording signal level at the particular value $E_o$. This operation is represented by a step (D) in the flow-chart. Throughout the process in which the recording signal level is being thus varied in response to the signals $S_1$, the bias signal control circuit 24 is latched in a condition delivering the bias current of the predetermined value I by the binary digital signal 20(H) supplied from the output port $P_5$ of the central processing unit 46.

Figure 8:
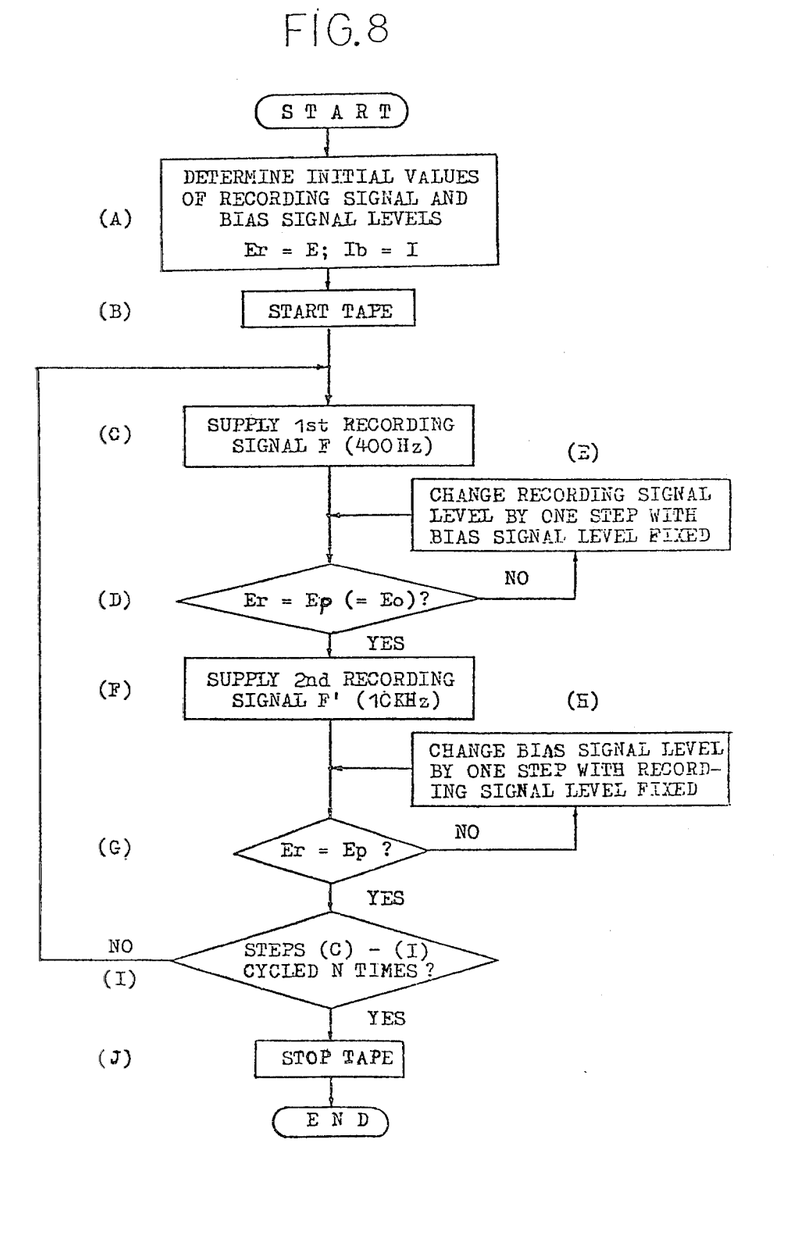
FIG. 8 is a flow-chart representing a program governing the operation of the device shown in FIG. 1.

Upon competion of the adjustment of the recording signal level in response to the relatively low frequency signal F delivered from the first frequency generator 10, the central processing unit 46 operates to shift the switch 12 to the position providing connection from the second frequency generator 10' to the recording-line amplifier 16, as shown as a step (F) in the flow-chart of FIG. 8. The signal F' having the relatively high frequency of, for example, 10 kilo-hertz is now supplied to the recording line of the sound recorder from the second frequency generator 10'. If, in this instance, the d.c. voltage $E_2$ delivered from the second d.c. voltage generator 42 responsive to the playback signal level Ep is lower than the d.c. voltage $E_1$ delivered from the first d.c. voltage generator 42 responsive to the recording signal level Er, the comparator 44 supplies the signal $C_1$ to the central processing unit 46. This makes the central processing unit 46 operative to supply the binary digital signals $S_2$ to the logic inverters $L_1, L_2, \ldots L_6$ (FIG. 4) of the bias signal control circuit 24 through the bus 58 and to control the circuit 24 to stepwise reduce the bias current Ib from the predetermined value I (FIG. 5). If, conversely, the d.c. voltage $E_2$ from the second d.c. voltage generator 42 is higher than the d.c. voltage $E_1$ from the first d.c. voltage generator 40, then the comparator 44 supplies the signal $C_2$ to the central processing unit 46 and makes the central processing unit 46 operative to control the bias signal control circuit 24 in such a manner as to stepwise increase the bias signal Ib beyond the predetermined value I. When the bias current Ib delivered from the bias signal control circuit 24 is thus reduced or increased to a certain value Io (FIG.

5) and as a consequence the signal levels Er and Ep of the recording and playback signals supplied to the first and second d.c. voltage generators 40 and 42 are equalized with each other, the comparator 44 ceases the supply of the signal $C_1$ or $C_2$ to the central processing unit 46 so that the bias signal control circuit 24 is held in a condition maintaining the bias current Ib at the above mentioned value Io. The above operations are represented by steps (G) and (H) in the flow-chart of FIG. 8.

The change thus caused in the bias signal Ib delivered from the bias signal control circuit 24 results in a change in the signal level Ep to be achieved in the playback line in response to the relatively low frequency signal F. To compensate for the change thus caused in the playback signal level Ep, the central processing unit 46 operates to shift the switch 12 to the former position providing connection from the first frequency generator 10 to the recording-line amplifier 16 through the switches 12 and 14 and to control the recording signal level control circuit 20 in such a manner as to produce a recording signal level Eo' which is effective to equalize the recording and playback signal levels Er and Ep. The alteration of the recording signal level from Eo to Eo' results in a change in the bias signal Ib to be delivered from the bias signal control circuit 24 in response to the relatively high frequency signal F'. Thus, the central processing unit 46 is made operative to shift the switch 12 for a second time to the position providing connection from the second frequency generator 10' to the recording-line amplifier 16 through the switches 12 and 14 for controlling the bias signal control circuit 24 in such a manner as to increase or decrease the bias current Ib from the above mentioned value Io to a certain value Io'. The above operation is represented by a step (I) in the flow-chart.

Upon completion of these steps taken by the central processing unit 46, the playback signal levels Ep in response to the relatively low and high frequency signals F and F' are made approximately equal to each other and provide substantially flat or constant recording and reproducing frequency characteristics throughout the low to medium and high frequency ranges.

It has been described that the adjustment of the recording signal level and the bias current is to be effected twice for each of the two variable parameters but it will be apparent that the preciseness of the control of the parameters will be enhanced if the number of the steps to adjust each of the recording signal level and the bias current is increased. When a predetermined number of steps or cycles for the adjustment are completed, the mechanical sections 60 are de-energized to stop advance of the recording tape as represented by a step (J) in the flow-chart.

While, furthermore, it has been described that the the recording signal level and the bias signal are adjusted by stepwise scanning the resistors having different resistance values, the adjustment of the recording signal level and the bias signal can be made in other manners by, for example, the use of a binary search system or a system in which the recording signal level is continuously or stepwise increased from a predetermined minimum value or reduced from a predetermined maximum value. If, in this instance, the recording signal level or the bias signal level is stepwise varied in such a manner as to be stepwise increased or decreased by adding or subtracting predetermined fractions such as $\frac{1}{2}$, $\frac{1}{4}$, $\frac{1}{8}$, 1/16, 1/32 and 1/64 to or from the recording signal level or the bias current, the recording signal level or the bias current can be adjusted to an optimum value by six arithmetic operations.

What is claimed is:

1. A magnetic tape sound recorder including a computer-controlled device for automatically adjusting the recording signal level and the level of the bias current to be superposed on the recording signal, wherein the improvement comprises sources of first and second recording signals having different frequencies, a recording signal level control circuit operative to vary the signal level of the recording signal supplied thereto, a bias signal control circuit operative to vary the level of the bias current to be impressed on the output signal from said recording signal level control circuit, and digital signal processing means coupled with said signal level control circuit and said bias signal control circuit and programmed to provide at least two consecutive cycles each consisting of a first step of varying the signal level of said first recording signal in said recording signal level control circuit with the level of said bias current fixed at a predetermined value in said bias signal control circuit until the signal level of the output signal delivered from the signal level control circuit reaches a value at which the signal level of the playback signal resulting from the output signal from the signal level control circuit is substantially equalized with the signal level of said output signal, and a second step of varying the level of said bias current in said bias signal control circuit with the signal level of the second recording signal fixed at said value of the signal level of said output signal until the signal level of the playback signal resulting from the output signal from the recording signal level control circuit is substantially equalized with the signal level of said output signal.

2. The improvement as set forth in claim 1, in which each of said recording signal level control circuit and said bias signal control circuit comprises a memory circuit having a predetermined number of input terminals connected to said digital signal processing means and so many output terminals respectively associated with said input terminals, a bus line connected between the input and output terminals of each control circuit, a plurality of resistors connected in parallel with one another between said bus line and a predetermined potential through switching elements which are respectively connected in series with the resistors and which have respective control terminals respectively connected to said output terminals of said memory circuit, said digital processing means being operative to supply binary digital signals to said input terminals of said memory circuit.

3. The improvement as set forth in claim 2, in which said bias signal control circuit further comprises a plurality of logic inverters connected between the memory circuit of the bias signal control circuit and said digital processing means.

4. A magnetic tape sound recorder having a recording line and a playback line, wherein the improvement comprises signal supply means operative to deliver first and second recording signals having different frequencies to said recording line, a recording signal level control circuit incorporated in said recording line and operative to vary the level of a signal supplied thereto, a bias signal control circuit connected to said recording signal level control circuit and operative to vary the level of a bias current to be superposed on an output signal from the recording signal level control circuit, first detecting means connected to said recording line for producing a signal variable in magnitude with the level of an output signal to be supplied to said recording signal level control circuit, second detecting means connected to said playback line for producing an output signal variable in magnitude with the level of a signal produced in the playback line, comparing means connected to the first and second detecting means and operative to compare the respective output signals from the first and second detecting means with each other for producing a signal indicative of the relationship between the two input signals, and digital signal processing means connected to said recording signal level control circuit and said bias signal control circuit and responsive to the output signal from said comparing means, said digital signal processing means being operative to actuate said signal supply means to deliver said first and second recording signals alternately to said recording line and being programmed to provide at least two consecutive cycles each consisting of a first step of varying the signal level of said first recording signal in said recording signal level control circuit with the level of said bias current fixed at a fixed value until the signal level of the output signal from said recording signal level control circuit reaches an adjusted value at which the output signals respectively delivered from said first and second detecting means are substantially equalized in magnitude with each other and a second step of varying the level of said bias current in said bias current control circuit with the signal level of the output signal from the recording signal level control circuit fixed at said adjusted value until the output signals respectively delivered from said first and second detecting means become substantially equal to each other.

5. A magnetic tape sound recorder as set forth in claim 4, wherein said signal supply means comprises a source of said first recording signal and a source of said second signal, the first recording signal being lower in frequency than the second recording signal.

6. A method for automatically adjusting the recording signal level and the level of the bias current to be superposed on the recording signal in a magnetic tape sound recorder which includes sources of first and second recording signals having different frequencies, a recording signal level control circuit operative to vary the signal level of the recording signal supplied thereto, a bias signal control circuit operative to vary the level of the bias current to be impressed on the output signal from said recording signal level control circuit, which method comprises; providing at least two consecutive cycles each consisting of a first step of varying the signal level of said first recording signal in said recording signal level control circuit with the level of said bias current fixed at a predetermined value in said bias signal control circuit until the signal level of the output signal delivered from said signal level control circuit reaches a value at which the signal level of the playback signal resulting from the output signal from the signal level control circuit is substantially equalized with the signal level of said output signal, and a second step of varying the level of said bias current in said bias signal control circuit with the signal level of the second recording signal fixed at said value of the signal level of said output signal until the signal level of the playback signal resulting from the output signal from the recording signal level control circuit is substantially equalized with the signal level of said output signal.

* * * * *